April 15, 1924.

J. B. FOOTE

TRACTOR

Filed Sept. 4, 1918   4 Sheets-Sheet 4

1,490,375

Witness:
John Enders

Inventor:
John B. Foote
By Fred Gerlach
his Atty.

Patented Apr. 15, 1924.

1,490,375

UNITED STATES PATENT OFFICE.

JOHN B. FOOTE, OF OAK PARK, ILLINOIS; JOHN T. KERWIN ADMINISTRATOR OF SAID JOHN B. FOOTE, DECEASED.

TRACTOR.

Application filed September 4, 1918. Serial No. 252,640.

*To all whom it may concern:*

Be it known that I, JOHN B. FOOTE, a citizen of the United States, and a resident of Oak Park, in the county of Cook and State of Illinois, have invented certain new and useful Improvements in Tractors, of which the following is a full, clear, and exact description.

The invention relates to driving mechanism for tractors.

One object of the invention is to provide improved planetary reducing gearing between the differential gearing and the traction wheels whereby the traction wheels will be driven at a reduced speed relatively to the differential, so that the traction wheels and the differential will be coaxially disposed.

A further object of the invention is to provide improved driving mechanism of this type which can be easily assembled and disassembled. A further object of the invention is to provide an improved driving mechanism of this type in which the planetary gearing will be disposed adjacent to the differential gearing and enclosed in the case which contains the differential.

Other objects of the invention will appear from the detailed description.

The invention consists in the several novel features hereinafter set forth and more particularly defined by claims at the conclusion hereof.

Figure 1:
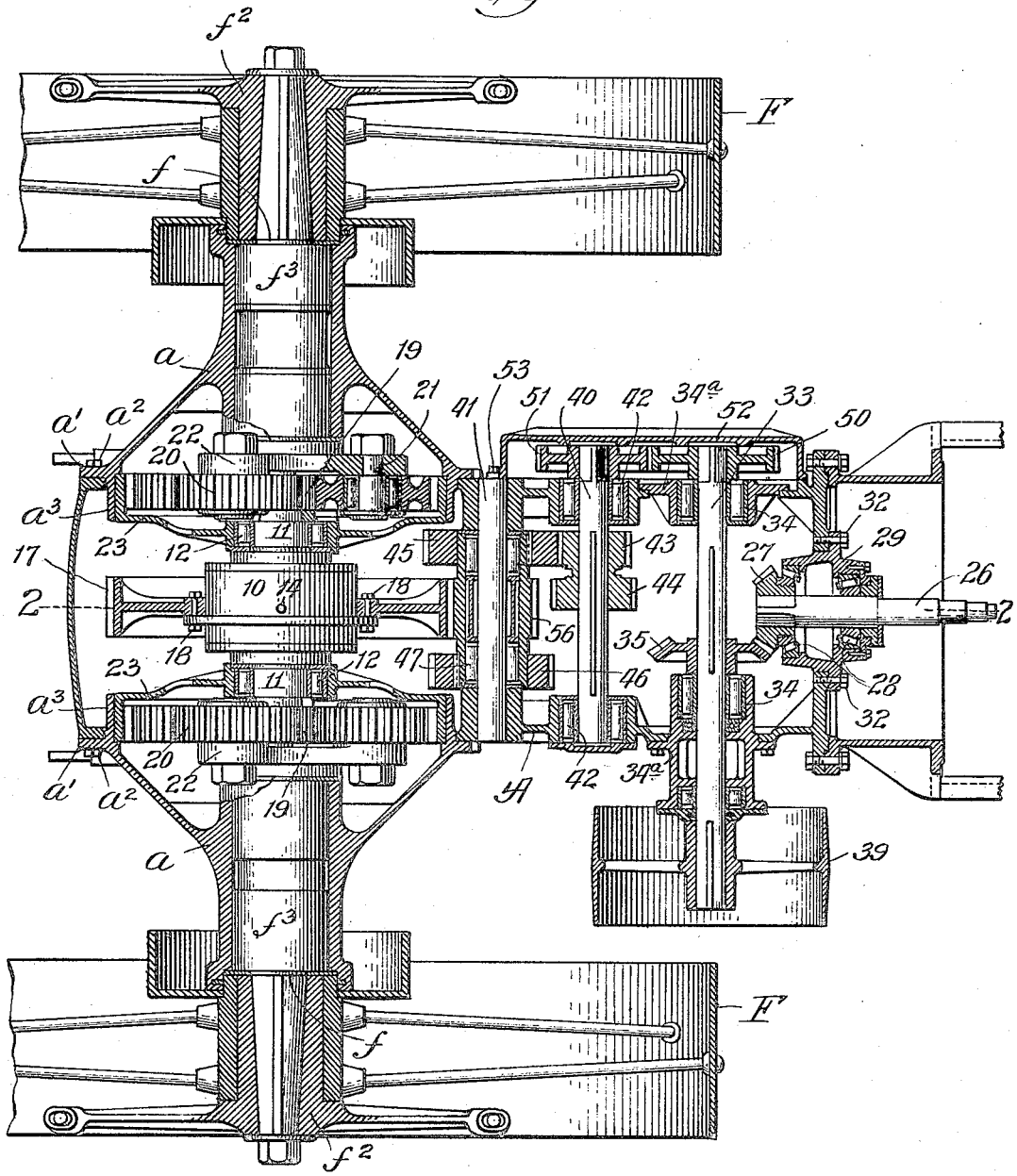
Figure 2:
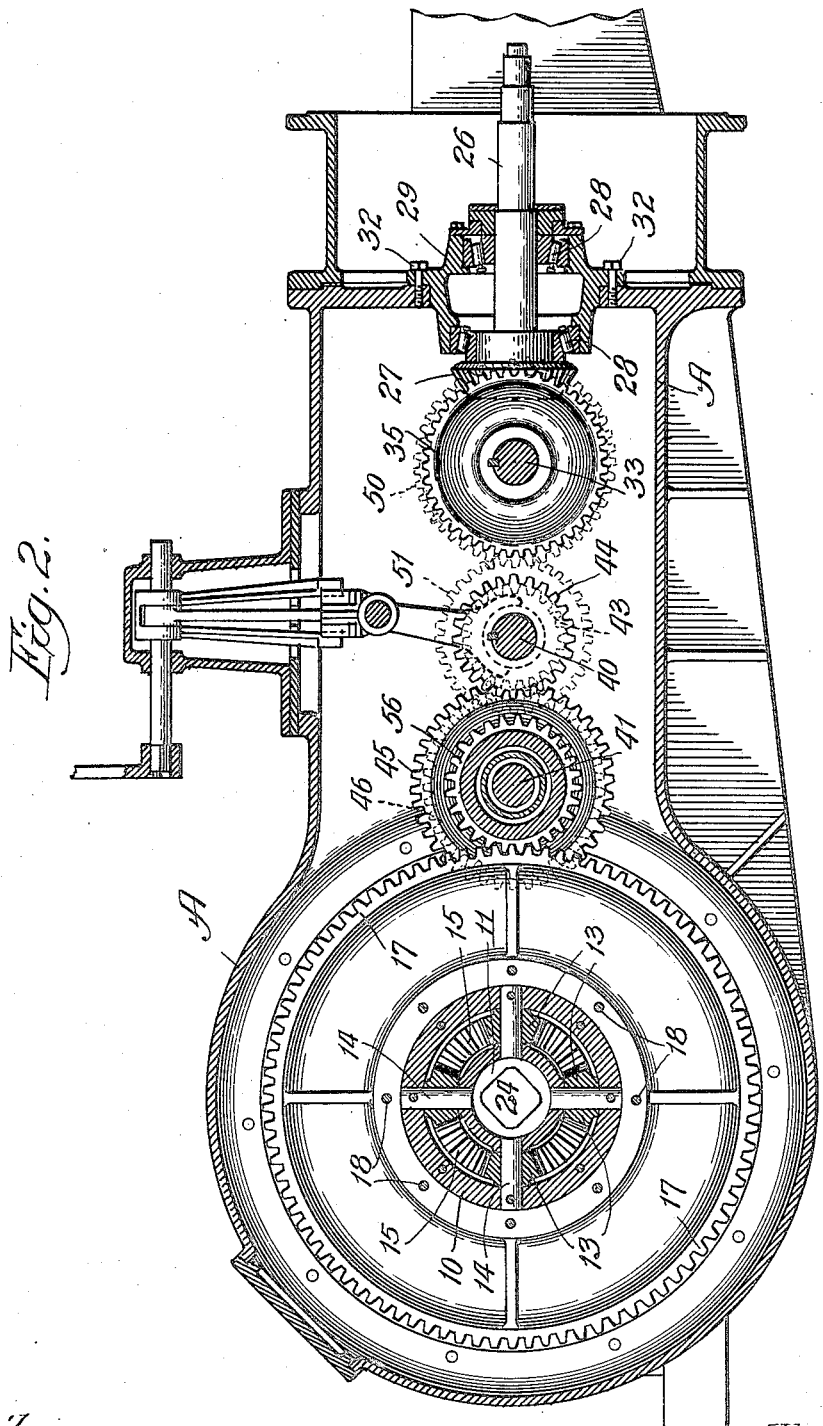
Figure 3:
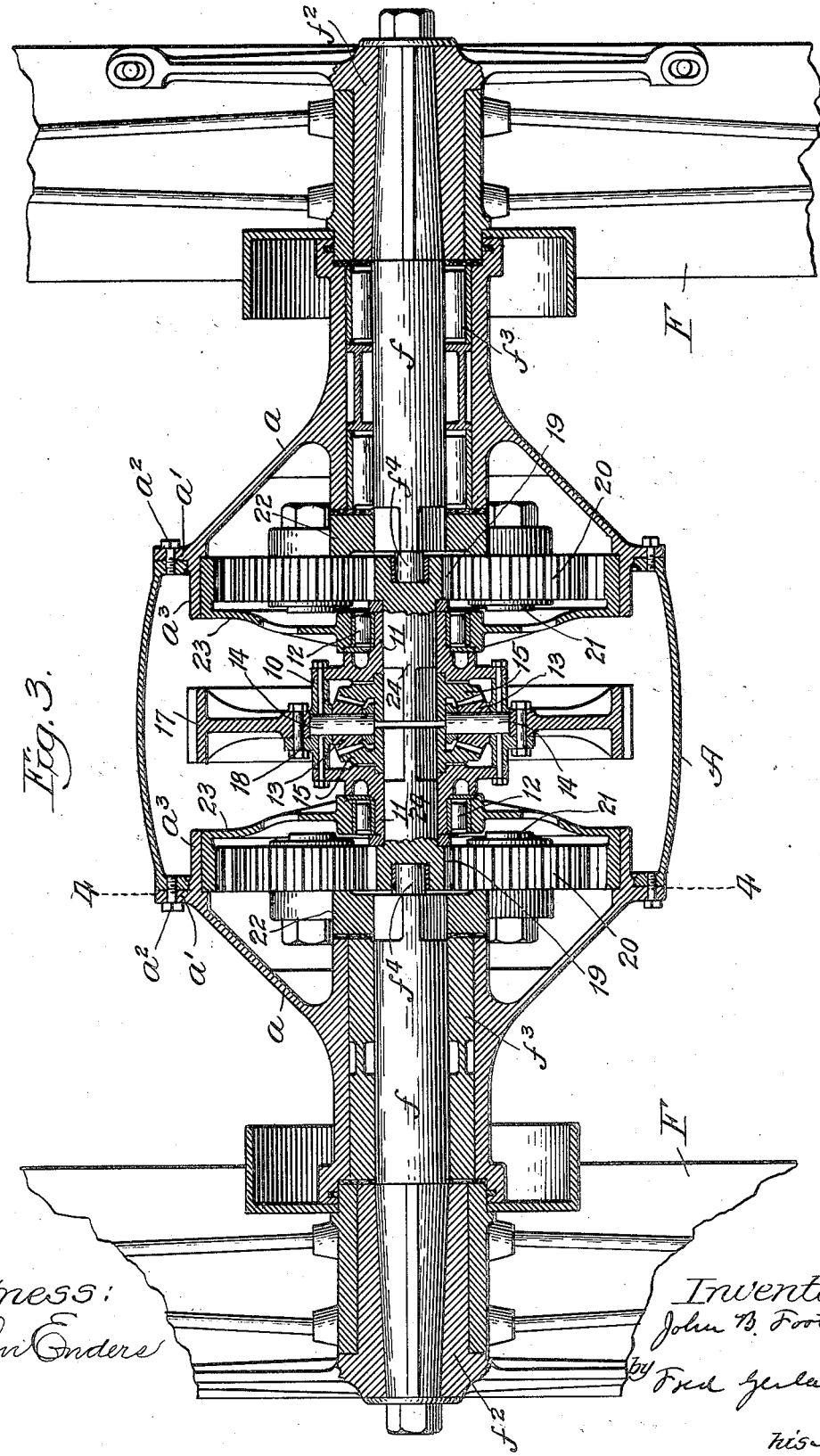
Figure 4:
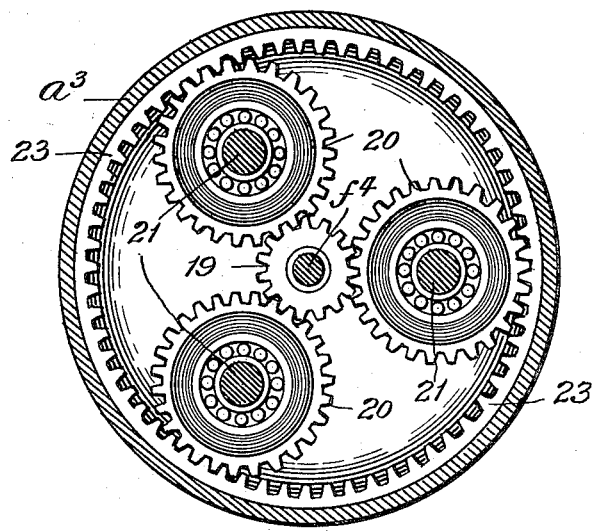
Figure 5:
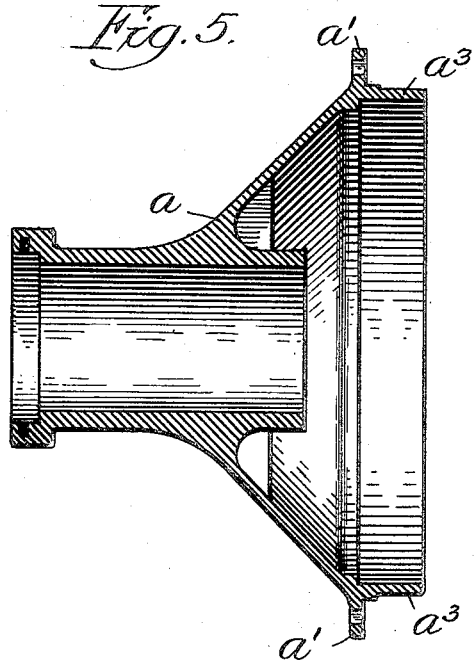
Figure 6:
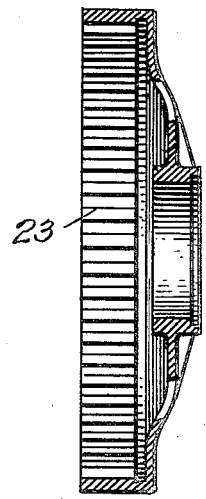

In the drawings: Fig. 1 is a horizontal section of driving mechanism embodying the invention. Fig. 2 is a longitudinal section taken on line 2—2 of Fig. 1. Fig. 3 is an axial section, parts being shown in elevation. Fig. 4 is a section taken on line 4—4 of Fig. 3. Fig. 5 is a detail of one of the axial sleeves and Fig. 6 is a detail of one of the stationary gear rings.

The improved driving mechanism is illustrated as applied to a pair of coaxial traction wheels F, which are driven through an axle composed of members *f*. The variable speed driving mechanism comprises a shaft 26 which may be driven from a motor in any suitable or well known manner, usually through a clutch. This shaft has fixed to its inner end a bevelled pinion 27 and is supported by suitable bearings 28 in a head 29. Said head is removably secured by bolts 32 to the front end of a gear case A, which is adapted to be secured to a suitable support, such as the framework or the motor casing.

The variable speed transmission gearing comprises a transverse shaft 33 which is mounted in bearings 34 which are carried by heads 34ª which are removably secured to the sides of the gear case A. A bevelled gear 35 is mounted to rotate with shaft 33 and meshes with the drive-pinions 27 on the shaft 26. One end of shaft 33 is extended to project from one side of the case and is there provided with a service pulley 39 which is adapted to drive a belt to operate any desired machine or mechanism other than the tractor itself.

The transmission gearing also comprises a transverse countershaft 40 and a second transverse countershaft 41. Shaft 40 is mounted in bearings 42 which are supported in the sides of gear case A.

The connection between the shafts 33 and 40 consists of a gear 50 which is removably connected to one end of shaft 33 and a gear 51 which is removably connected to the adjacent end of the shaft 40. Gears 50 and 51 are disposed outwardly of the bearings for shafts 33 and 40 at one side of the case so they can be removed without disturbing the shafts or gearing in the case A and a cover 52 is removably secured by bolts 53 to one side of the case A to enclose these gears.

A low speed pinion 43 and a high speed pinion 44, which are integral, are slidably mounted on the shaft 40. Pinions 43 and 44 are connected to shaft 40, so they will be rotated thereby and are slidable on said shaft to permit the low speed pinion 43 to be shifted into engagement with a gear wheel 45 and so that the high speed pinion 44 may be shifted into engagement with a gear wheel 46. Gears 45 and 46 are fixed to the hub of a pinion 56 which is supported to revolve on the shaft 41 by bearings 47. Any suitable controlling mechanism may be used for shifting the high and low speed pinions.

The differential gearing through which the traction wheels are driven comprises a gear ring 17 which meshes with the pinion 56 on the shaft 41. Said ring 17 is secured to a drum 10 by bolts 18 and hubs 11 of the drum are journalled in the bearings 12. Planetary bevelled pinions 13 are mounted on radial arbors 14 in the drum and bevelled gears 15, which mesh with the pinions 13, are drivably connected to the stud shafts 24 respectively. The inner ends of the stud shafts 24 are squared or suitably formed to be driven by the gears 15 respectively, and so that they can be withdrawn longitudinally from the gears in disassembling the gearing. Pinions 19 are integrally formed with said shafts 24 respectively to drive planetary gearing through which the axle sections and traction wheels will be respectively driven.

Sleeves $a$ are provided with flanges $a'$ which are secured to the sides of the gear case A by bolts $a^2$ and with inwardly extending flanges $a^3$. The rims of stationary gear rings 23 are secured in flanges $a^3$ respectively and the hubs of these gear wheels are adapted to carry the bearing 12 for the hubs rotating with the drum 10. Sleeves $a$ are extended outwardly to enclose the axle sections $f$ and to carry bearings $f^3$, in which the axial sections rotate. Spiders or frames 22 are secured to the inner ends of the axial sections respectively and are provided with arms, in which studs 21 are secured. Planetary pinions 20 are rotatably mounted on said studs and are adapted to engage one of the pinions 19 and one of the stationary gear rings 23. To keep the stud shafts 24 and the axle members truly aligned, the inner ends of the axle sections are provided with studs $f^4$, which extend into sockets in the pinions 19 respectively.

The outer ends of the axle sections $f$ pass through and are keyed to hubs $f^2$ which are connected to drive the traction wheels in any suitable manner.

In operation, the pinions 56 will be driven at high or low speed, as may be desired and will drive the gear 17 which will cause the differential gear drum to be rotated in its bearings 12 in gears 23. The stud shafts 24 will be driven by the gears 15 respectively and will correspondingly drive the pinions 19. Said pinions will drive the planetary pinions 20 which engage the stationary gears 23 and will drive the axle sections at a reduced speed relatively to the differential gearing.

This construction can be conveniently disassembled as is sometimes necessary in case of breakage. By removing bolts $a^2$, the sleeve $a$, the planetary gear and stud shaft 24 and gear 23 may be separated from the gear case as an entity, so that the inner end of this structure may be disposed for convenient access to the several parts therein.

The invention exemplifies an improved gearing for tractors, in which planetary reducing gearing is employed between the differential gearing and the traction wheels and in which the differential and traction wheel axle are coaxial; also gearing of this type, in which the planetary gearing is enclosed with the differential gearing and is enclosed in a common case with the variable speed and the differential gearings; also a construction of this type in which the planetary gearing is disposed at the inner ends of the axle housings or sleeves which extend between the gear case and the traction wheels; also a construction of this type in which the parts can be conveniently disassembled in event repair is necessary; also a construction of this type in which all of the gearing is compactly arranged and enclosed.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a tractor, the combination of traction wheels, mechanism for driving the differential gearing, a case for said gearing having openings in its sides thru which the differential gearing is insertable and removable, heads secured to close the openings in said sides, axles in the heads for driving the traction wheels and reducing gearing between the differential and the inner ends of the axles inside of the heads and removable therewith.

2. In a tractor, the combination of traction wheels, differential gearing, mechanism for driving the differential gearing, a case for said gearing having openings in its sides thru which the differential gearing is insertable and removable, sleeves provided with heads, secured to close the openings in said sides, axles mounted in the sleeves for driving the traction wheels, reducing gearing between the differential gearing and the inner ends of the axles, disposed inside of the sleeves and removable therewith.

3. In a tractor, the combination of traction wheels, differential gearing, mechanism for driving the differential gearing, a case for said gearing having openings in its sides thru which the differential gearing is insertable and removable, axles for the traction wheels, reducing gearing between the inner ends of the axles and the differential gearing, bearings for the differential gearing, and means for removably supporting said bearings, removably secured to the casing, and insertable thru said openings.

4. In a tractor, the combination of traction wheels, differential gearing, mechanism for driving the differential gearing, a case for said gearing having openings in its sides thru which the differential gearing is insertable and removable, axles for the traction wheels, planetary reducing gearing between the differential and the inner ends of the axles, bearings for the differential, and means for supporting said bearings, insertable and removable thru said openings.

5. In a tractor, the combination of traction wheels, differential gearing between the wheels comprising a drum, stud-shafts mounted in the drum, axles for driving the wheels respectively, pinions on the outer ends of the stud shafts and planetary reducing gearing between each pinion and the inner ends of an axle, comprising a stationary gear, and bearings for the drum carried by said stationary gear.

6. In a tractor, the combination of traction wheels, differential gearing between the wheels comprising a drum, stud shafts mounted in the drum, axles for driving the wheels respectively, pinions on the outer ends of the stud shafts and planetary reducing gearing between each pinion and one of the axles comprising a stationary gear, bearings for the drum carried by said stationary gear, and a case conjointly enclosing the differential and reducing gearings.

7. In a tractor, the combination of traction wheels, differential gearing between the wheels, mechanism for driving the differential gearing, a case for said gearing comprising sleeves extending outwardly therefrom to the traction wheel and removably secured thereto, axles in the sleeves respectively and having their outer ends connected to the traction wheels respectively, planetary reducing gearing between the differential gearing and each of the traction wheels, said reducing gearing being removable from the case with the sleeves respectively.

8. In a tractor, the combination of traction wheels, differential gearing between the wheels, mechanism for driving the differential gearing, a case for said gearing comprising sleeves extending outwardly from and removably secured thereto, axles in the sleeves respectively and having their outer ends connected to the traction wheels respectively, stud shafts and pinions operated by the differential gearing, and planetary reducing gearing between the differential and each axle, comprising a stationary gear, each planetary reducing gearing and a stud shaft being conjointly removable with a sleeve.

9. In a tractor, the combination of traction wheels, differential gearing between the wheels, mechanism for driving the differential gearing, a case for said gearing comprising sleeves extending outwardly from and removably secured thereto, axles in the sleeves respectively and having their outer ends connected to the traction wheels respectively, stud shafts and pinions operated by the differential gearing and planetary reducing gearing for each axle, comprising a stationary gear, said stationary gear being removable with a sleeve.

10. In a tractor, the combination of traction wheels, differential gearing, mechanism for driving the differential gearing, axles for driving the wheels respectively, stud shafts operated by the differential gearing, planetary reducing gearing between the stud shafts and the axles respectively, and interfitting connections between the contiguous ends of the stud shafts and the axles respectively.

11. In a tractor, the combination of traction wheels, differential gearing, mechanism for driving the differential gearing, axles for driving the wheels respectively, stud shafts operated by the differential gearing, planetary reducing gearing between the stud shafts and the axles respectively, interfitting connections between the contiguous ends of the stud shafts and the axles respectively, and a case enclosing the differential and reducing gearings and comprising sleeves in which the axles are journalled respectively.

JOHN B. FOOTE.